(12) United States Patent
Ichikawa et al.

(10) Patent No.: US 8,970,060 B2
(45) Date of Patent: Mar. 3, 2015

(54) POWER FEEDING SYSTEM AND ELECTRICAL POWERED VEHICLE

(75) Inventors: Shinji Ichikawa, Toyota (JP); Taira Kikuchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1013 days.

(21) Appl. No.: 13/120,378

(22) PCT Filed: Sep. 25, 2008

(86) PCT No.: PCT/JP2008/067265
§ 371 (c)(1),
(2), (4) Date: Jun. 3, 2011

(87) PCT Pub. No.: WO2010/035321
PCT Pub. Date: Apr. 1, 2010

(65) Prior Publication Data
US 2011/0231029 A1    Sep. 22, 2011

(51) Int. Cl.
*B60L 1/00* (2006.01)
*H02J 7/02* (2006.01)
(Continued)

(52) U.S. Cl.
CPC ............. *H02J 7/025* (2013.01); *B60L 11/123* (2013.01); *B60L 11/14* (2013.01); *B60L 11/182* (2013.01); *B60L 11/1838* (2013.01); *B60L 2210/10* (2013.01); *B60L 2220/14* (2013.01); *Y02T 10/6217* (2013.01); *Y02T 10/7005* (2013.01);
(Continued)

(58) Field of Classification Search
CPC ......... H02J 7/0068; H02J 7/025; H02J 5/005; Y02E 60/12; Y02T 90/128; Y02T 10/7005; Y02T 90/14; Y02T 90/122; Y02T 10/7077; H01F 38/14; H02M 3/18; H02M 3/07; H03K 3/55; H03K 3/537; H03K 3/53
See application file for complete search history.

(56) References Cited

U.S. PATENT DOCUMENTS 5,850,135 A    12/1998    Kuki et al.
7,741,734 B2    6/2010    Joannopoulos et al.
(Continued)

FOREIGN PATENT DOCUMENTS

AU    2006269374 B2    1/2007
AU    2006269374 C1    1/2007
(Continued)

OTHER PUBLICATIONS

Russian Office Action issued in Application No. 2011116061/11(023902); Dated Jul. 2, 2012 (With Translation).
(Continued)

*Primary Examiner* — Rexford Barnie
*Assistant Examiner* — Terrence Willoughby
(74) *Attorney, Agent, or Firm* — Oliff PLC

(57) ABSTRACT

Power feeding is performed in a non-contact manner from a power feeding device to an electrical powered vehicle by resonance of a primary self-resonant coil of the power feeding device and a secondary self-resonant coil of the electrical powered vehicle through an electromagnetic field. The electric power received by the secondary self-resonant coil is rectified by a rectifier, and voltage-converted by a DC/DC converter to be supplied to a power storage device. A vehicle ECU controls the DC/DC converter such that the voltage between the rectifier and the DC/DC converter attains a target voltage.

23 Claims, 11 Drawing Sheets

(51) Int. Cl.
*B60L 11/12* (2006.01)
*B60L 11/14* (2006.01)
*B60L 11/18* (2006.01)

(52) U.S. Cl.
CPC .......... *Y02T 10/7077* (2013.01); *Y02T 10/7088* (2013.01); *Y02T 10/7216* (2013.01); *Y02T 90/122* (2013.01); *Y02T 90/127* (2013.01); *Y02T 90/128* (2013.01); *Y02T 90/14* (2013.01); *Y02T 90/163* (2013.01); *B60L 2200/26* (2013.01)
USPC .......................... 307/10.1; 307/104; 320/108

(56) References Cited

U.S. PATENT DOCUMENTS

| | | | |
|---|---|---|---|
| 7,825,543 B2 * | 11/2010 | Karalis et al. | 307/104 |
| 8,159,182 B2 * | 4/2012 | Kato et al. | 320/108 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 075 070 A2 | 2/2001 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-07-227003 | 8/1995 |
| JP | A-09-102329 | 4/1997 |
| JP | A-09-130905 | 5/1997 |
| JP | A-2006-174676 | 6/2006 |
| JP | A-2008-220130 | 9/2008 |
| JP | A-2009-501510 | 1/2009 |
| KR | 2008-0031398 A | 4/2008 |
| KR | 2010-0015954 A | 2/2010 |
| RU | 2 306 654 CI | 9/2007 |
| WO | WO 2007/008646 A2 | 1/2007 |
| WO | WO 2008/118178 A1 | 10/2008 |

OTHER PUBLICATIONS

Kurs et al., "Wireless Power Transfer via Strongly Coupled Magnetic Resonances," *Science*, vol. 37, pp. 83-86, Jul. 6, 2007.
International Search Report issued in Application No. PCT/JP2008/067265; Dated Dec. 16, 2008 (With Translation).

* cited by examiner

POWER FEEDING SYSTEM AND ELECTRICAL POWERED VEHICLE

TECHNICAL FIELD

The present invention relates to a power feeding system and an electrical powered vehicle, and particularly, to the technique of supplying electric power to a vehicle in a non-contact manner from a power source external to the vehicle.

BACKGROUND ART

Great attention is focused on electrical powered vehicles such as an electric vehicle and hybrid vehicle as environment-friendly vehicles. These vehicles incorporate an electric motor for generating a driving force for running, and a rechargeable power storage device for storing electric power to be supplied to the electric motor. A hybrid vehicle refers to a vehicle incorporating an internal combustion engine as a power source, in addition to an electric motor, or a vehicle further incorporating a fuel cell in addition to a power storage device as the direct current power source for driving the vehicle.

Among the hybrid vehicles there is known a vehicle that allows charging of the vehicle-mounted power storage device from a power source external to the vehicle, likewise with an electric vehicle. For example, the so-called "plug-in hybrid vehicle" is known that allows the power storage device to be charged from a general household power supply by establishing connection between the plug socket located at an establishment and the charging inlet provided at the vehicle through a charging cable.

As a method for power transfer, attention is recently focused on wireless electrical power transmission without using power supply cords and/or cables for electrical transmission. Three promising approaches of this wireless power transfer technique are known, i.e. power transfer using electromagnetic induction, power transfer using electromagnetic waves, and power transfer through the resonance method.

The resonance method thereof is a non-contact power transfer approach transferring power via an electromagnetic field by causing resonance at a pair of resonators (for example, a pair of self-resonant coils) at the electromagnetic field (near field), allowing electric power as high as several kW to be transferred over a relatively long distance (for example, several meters) (refer to Non-Patent Document 1).

Patent Document 1: Japanese Patent Laying-Open No. 2006-174676
Patent Document 2: Japanese Patent Laying-Open No. 9-102329
Patent Document 3: WO 2007/008646
Non-Patent Document 1: Andre Kurs et al., "Wireless Power Transfer via Strongly Coupled Magnetic Resonances", [online], Jul. 6, 2007, Science, Volume 317, p. 83-86, [Searched on Sep. 12, 2007], Internet <URL; http://www-.sciencemag. org/cgi/reprint/317/5834/83.pdf>

DISCLOSURE OF THE INVENTION

Problems to be Solved by the Invention

In the case where the wireless power transfer technique disclosed in the aforementioned "Wireless Power Transfer via Strongly Coupled Magnetic Resonances" is applied to a power feeding system for a vehicle, power control improving the power feeding efficiency is an issue. However, the aforementioned documents do not particularly teach about a specific power control technique to supply power efficiently.

Therefore, an object of the present invention is to provide a power control technique realizing power feeding efficiently at a non-contact power feeding system that feeds power by way of a resonance method.

Another object of the present invention is to provide a power control technique realizing power reception efficiently in an electrical powered vehicle receiving electric power from a power feeding device external to the vehicle by way of a resonance method.

Means for Solving the Problems

A power feeding system according to the present invention includes a power transmission resonator, a power reception resonator, a rectifier, a voltage converter, and a voltage control device. The power transmission resonator receives electric power from a power source to generate an electromagnetic field. The power reception resonator receives electric power from the power transmission resonator by resonating with the power transmission resonator via the electromagnetic field. The rectifier rectifies the electric power received by the power reception resonator. The voltage converter voltage-converts the electric power rectified by the rectifier for supply to a load. The voltage control device controls the voltage between the rectifier and the voltage converter to attain a predetermined target voltage.

Preferably, the voltage control device sets a target voltage based on the magnitude of the reception electric power.

Preferably, the voltage control device sets the target voltage at the square root value of a multiplication of a target value of reception electric power by a target impedance.

Further preferably, the target impedance is set at the impedance of the power source.

Preferably, the power feeding system further includes a sensor device. The sensor device senses a reflected power of the electric power supplied from the power source to the power transmission resonator. The voltage control device modifies the target voltage such that the reflected power is reduced.

Further preferably, the voltage control device calculates, when the reflected power is greater than or equal to a defined value, the amount of modification of the target voltage based on the difference between a target value of the reflected power lower than or equal to the defined value and the reflected power sensed by the sensor device.

Preferably, the sensor device calculates the reflected power based on the voltage and current of the electric power supplied from the power source to the power transmission resonator, and the phase difference between the voltage and current.

Preferably, the voltage converter is configured to allow adjustment of an input voltage thereto. The voltage control device controls the voltage converter such that the voltage between the rectifier and the voltage converter attains the target voltage.

Also preferably, the voltage converter is configured to allow adjustment of an input electric power thereto. The voltage control device controls the power source such that the voltage between the rectifier and the voltage converter attains the target voltage.

Preferably, the power transmission resonator includes a primary coil and a primary self-resonant coil. The primary coil receives electric power from the power source. The primary self-resonant coil has electric power fed by electromagnetic induction from the primary coil to generate an electromagnetic field. The power reception resonator includes a secondary self-resonant coil, and a secondary coil. The secondary self-resonant coil receives electric power from the primary self-resonant coil by resonating with the primary self-resonant coil via the electromagnetic field. The secondary coil extracts the electric power received by the secondary self-resonant coil through electromagnetic induction for output to the rectifier.

Further preferably, each of the power transmission resonator and power reception resonator includes a high dielectric disk.

Preferably, the load includes a rechargeable power storage device.

Also preferably, the load includes an electric drive device mounted on the vehicle to generate a vehicle driving power. The electric drive device receives electric power output from the voltage converter to generate the vehicle driving power.

An electrical powered vehicle of the present invention includes a power reception resonator, a rectifier, a voltage converter, an electric drive device, and a power control device. The power reception resonator receives electric power from a power transmission resonator included in a power feeding device provided external to the vehicle by resonating with the power transmission resonator via an electromagnetic field. The rectifier rectifies the electric power received by the power reception resonator. The voltage converter voltage-converts the electric power rectified by the rectifier. The electric drive device generates a vehicle driving power using the electric power output from the voltage converter. The voltage control device controls the voltage between the rectifier and the voltage converter to attain a predetermined target voltage.

Preferably, the voltage control device sets the target voltage based on the magnitude of the reception electric power.

Preferably, the voltage control device sets the target voltage at the square root value of a multiplication of a target value of reception electric power by a target impedance.

Further preferably, the target impedance is set at the impedance of the power feeding device.

Preferably, the electrical powered vehicle further includes a communication device for communication with the power feeding device. At the power feeding device, a reflected power of the electric power supplied from the power source to the power transmission resonator is sensed. The voltage control device receives the reflected power sensed at the power feeding device through the communication device to modify the target voltage such that the reflected power is reduced.

Further preferably, the voltage control device calculates, when the reflected power is greater than or equal to a defined value, an amount of modification of the target voltage based on the difference between a target value of reflected power that is less than or equal to the defined value and the reflected power received through the communication device.

Preferably, the reflected power is calculated based on the voltage and current of the electric power supplied from the power source to the power transmission resonator, and the phase difference between the voltage and current.

Preferably, the voltage converter is configured to allow adjustment of an input voltage thereto. The voltage control device controls the voltage converter such that the voltage between the rectifier and the voltage converter attains the target voltage.

Further preferably, the electrical powered vehicle further includes a communication device for communication with the power feeding device. The voltage converter is configured to allow adjustment of an input electric power thereto. The voltage control device controls a power source via the communication device such that the voltage between the rectifier and the voltage converter attains the target voltage.

Preferably, the power transmission resonator includes a primary coil and a primary self-resonant coil. The primary coil receives electric power from the power source. The primary self-resonant coil has electric power fed by electromagnetic induction from the primary coil to generate an electromagnetic field. The power reception resonator includes a secondary self-resonant coil, and a secondary coil. The secondary self-resonant coil receives electric power from the primary self-resonant coil by resonating with the primary self-resonant coil via the electromagnetic field. The secondary coil extracts the electric power received by the secondary self-resonant coil through electromagnetic induction for output to the rectifier.

Further preferably, each of the power transmission resonator and power reception resonator includes a high dielectric disk.

Preferably, the electrical powered vehicle further includes a power storage device storing electric power output from the voltage converter.

Effects of the Invention

In the present invention, by virtue of the power transmission resonator and power reception resonator resonating at the electromagnetic field, power is transferred in a non-contact manner from the power transmission resonator to the power reception resonator via the electromagnetic field. The electric power received by the power reception resonator is rectified by the rectifier and voltage-converted by the voltage converter to be supplied to the load. Since the voltage between the rectifier and the voltage converter can be controlled to attain a predetermined target voltage in the present invention, impedance matching can be established between the power transmission side and power reception side according to the reception electric power. Therefore, according to the present invention, non-contact power feeding of high efficiency can be realized by way of a resonance method.

Figure 1:
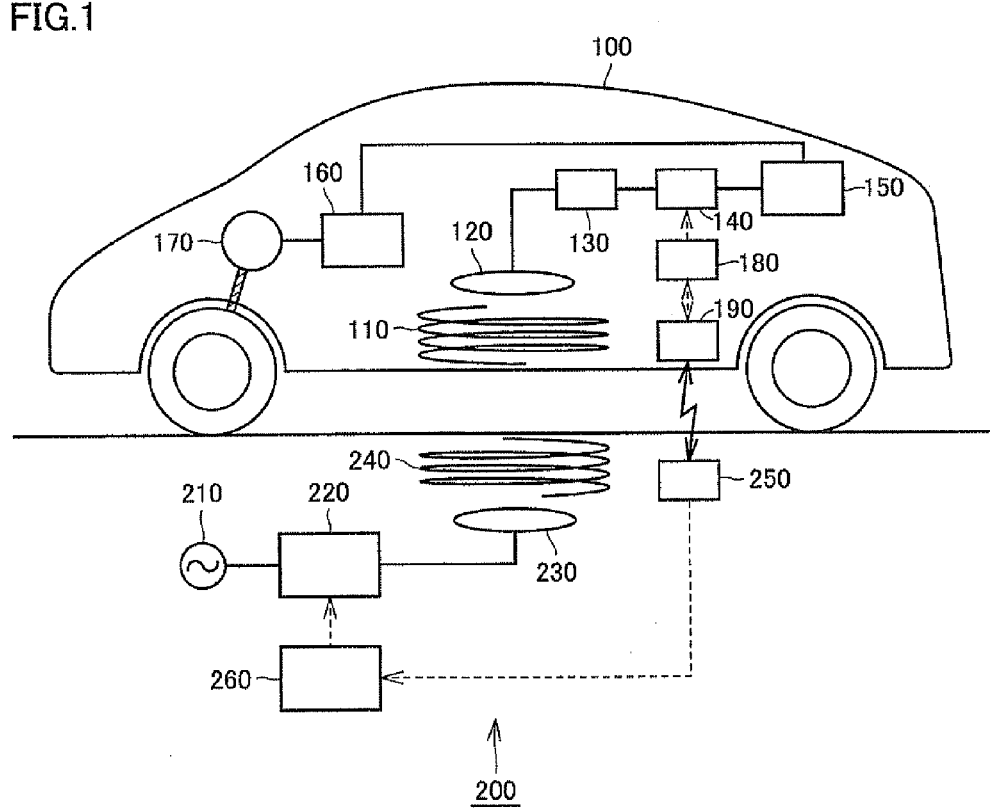
FIG. 1 represents an entire configuration of a power feeding system according to a first embodiment of the present invention.

DESCRIPTION OF THE REFERENCE SIGNS 100, 100A-100C electrical powered vehicle; 110, 340 secondary self-resonant coil; 120, 350 secondary coil; 130 rectifier; 140 DC/DC converter; 142 DC/AC conversion unit; 144 transformer unit; 146 rectifier unit; 150 power storage device; 160 PCU; 162 boost converter; 164, 166 inverter; 170 motor; 172, 174 motor generator; 176 engine; 177 power split device; 178 driving wheel; 180, 180A, 180B vehicle ECU; 181 target voltage set unit; 182, 182A DC/DC converter control unit; 183 control command generation unit; 184 subtracter; 185 PI control unit; 186 correction control unit; 187 adder; 190, 250 communication device; 192 voltage sensor; 194 current sensor; 196 indicator lamp; 200, 200A, 200B power feeding device; 210 AC power source; 220 high frequency power driver; 230, 320 primary coil; 240, 330 primary self-resonant coil; 260, 260A ECU; 262 zero-cross detector; 264 phase difference calculation unit; 266 reflected power calculation unit; 270 reflected power sensor device; 310 high frequency power source; 360 load; 380 capacitor; 410 primary high dielectric filter; 420 secondary high dielectric filter; SMR1, SMR2 system main relay.

BEST MODES FOR CARRYING OUT THE INVENTION

Embodiments of the present invention will be described hereinafter in detail with reference to the drawings. The same or corresponding elements in the drawings have the same reference characters allotted, and description thereof will not be repeated.

[First Embodiment]

FIG. 1 represents an entire configuration of a power feeding system according to a first embodiment of the present invention, Referring to FIG. 1, the power feeding system includes an electrical powered vehicle 100, and a power feeding system 200. Electrical powered vehicle 100 includes a secondary self-resonant coil 110, a secondary coil 120, a rectifier 130, a DC/DC converter 140, and a power storage device 150. Electrical powered vehicle 100 further includes a power control unit (hereinafter, also referred to as PCU) 160, a motor 170, a vehicle ECU (Electronic Control Unit) 180, and a communication device 190.

Although secondary self-resonant coil 110 is arranged at the lower portion of the vehicle body, it may be arranged at the upper portion of the vehicle body if power feeding device 200 is disposed above the vehicle, Secondary self-resonant coil 110 is an LC resonant coil having both ends open (non-connected), and receives the electric power from power feeding device 200 by resonating with primary self-resonant coil 240 of power feeding device 200 (described afterwards) via an electromagnetic field. Although the capacitor component of secondary self-resonant coil 110 corresponds to the floating capacitance of the coil here, a capacitor may be provided across the ends of the coil.

Secondary self-resonant coil 110 has its number of windings set appropriately such that the Q value representing the resonance strength between primary self-resonant coil 240 and secondary self-resonant coil 110 (for example, Q>100), the K value representing the degree of coupling thereof and the like become higher based on the distance from primary self-resonant coil 240 of power feeding device 200, the resonant frequency of primary self-resonant coil 240 and secondary self-resonant coil 110, and the like.

Secondary coil 120 is arranged coaxial with secondary self-resonant coil 110, and can be coupled magnetically with secondary self-resonant coil 110 by electromagnetic induction. Secondary coil 120 extracts the electric power received by secondary self-resonant coil 110 through electromagnetic induction for output to rectifier 130. Rectifier 130 rectifies AC power extracted by secondary coil 120.

DC/DC converter 140 responds to a control signal from vehicle ECU 180 to convert the electric power rectified by rectifier 130 to the voltage level of power storage device 150 for output thereto. In the case where power is received from power feeding device 200 during a running operation of the vehicle (in this case, power feeding device 200 may be arranged, for example, at the upper portion or side portion of the vehicle), DC/DC converter 140 may convert the electric power rectified by rectifier 130 into system voltage for direct supply to PCU 160.

Power storage device 150 is a rechargeable DC power source, formed of a secondary battery such as lithium ion or nickel-metal hydride. Power storage device 150 stores the electric power supplied from DC/DC converter 140, as well as the regenerative electric power generated by motor 170. Power storage device 150 supplies the stored electric power to PCU 160, A capacitor of large capacitance may be employed as power storage device 150. Any power buffer is applicable as long as it can temporarily store the electric power supplied from power feeding device 200 and/or the regenerative electric power from motor 170 and supply the stored electric power to PCU 160.

PCU 160 drives motor 170 by the electric power output from power storage device 150 or the electric power directly supplied from DC/DC converter 140. PCU 160 rectifies the regenerative electric power generated by motor 170 for output to power storage device 150, whereby power storage device 150 is charged. Motor 170 is driven by PCU 160 to generate vehicle driving power, which is provided to driving wheels. Motor 170 generates electric power using the kinetic energy received from driving wheels and an engine not shown, and outputs the generated regenerative electric power to PCU 160.

In a power feeding mode from power feeding device 200 to electrical powered vehicle 100, vehicle ECU 180 controls DC/DC converter 140 such that the voltage between rectifier 130 and DC/DC converter 140 attains a predetermined target voltage. As used herein, vehicle ECU 180 sets the target voltage according to the equation set forth below, based on the magnitude of the electric power received from power feeding device 200:

$$VHref = \sqrt{(P \times R)} \quad (1)$$

where P is the target value of the electric power received from power feeding device 200, and R is the target impedance. By controlling the voltage between rectifier 130 and DC/DC converter 140 to attain the above-described target voltage VHref, the impedance can be set at the target impedance R without depending on the reception electric power. By setting, for example, the target impedance R based on the impedance value of power feeding device 200, impedance matching between power feeding device 200 of the power feeding side and electrical powered vehicle 100 of the power receiving side can be established.

The impedance value of power feeding device 200 can be obtained therefrom through communication device 190. Vehicle ECU 180 detects the reception electric power at electrical powered vehicle 100, and transmits the detected value to power feeding device 200 through communication device 190.

In a vehicle running mode, vehicle ECU 180 controls PCU 160 based on the vehicle running state and the state of charge (hereinafter, also referred to as SOC) of power storage device 150. Communication device 190 functions as a communication interface to effect wireless communication with power feeding device 200 external to the vehicle.

Power feeding device 200 includes an AC power source 210, a high frequency power driver 220, a primary coil 230, a primary self-resonant coil 240, a communication device 250, and an ECU 260.

AC power source 210 is external to the vehicle, and a system power source, for example. High frequency power driver 220 converts the electric power received from AC power source 210 into an electric power of high frequency. The converted high frequency electric power is supplied to primary coil 230. The frequency of the high frequency electric power generated by high frequency power driver 220 is 1M to ten and several MHz, for example.

Primary coil 230 is arranged coaxial with primary self-resonant coil 240, and can be coupled magnetically with primary self-resonant coil 240 by electromagnetic induction. Primary coil 230 feeds the high frequency electric power supplied from high frequency power driver 220 to primary self-resonant coil 240 by electromagnetic induction.

Although primary self-resonant coil 240 is arranged in proximity to the ground, it may be arranged above the vehicle in the case where power is fed to electrical powered vehicle 100 from above the vehicle. Primary self-resonant coil 240 is similarly an LC resonant coil having both ends open (non-contact), and transfers electric power to electrical powered vehicle 100 by resonating with secondary self-resonant coil 110 of electrical powered vehicle 100 via an electromagnetic field. Although the capacitor component of primary self-resonant coil 240 similarly corresponds to the floating capacitance of the coil, a capacitor may be connected across the ends of the coil.

Primary self-resonant coil 240 has its number of windings set appropriately such that the Q value (for example, Q>100), the coupling degree ic and the like become higher based on the distance from secondary self-resonant coil 110 of electrical powered vehicle 100, the resonant frequency of primary self-resonant coil 240 and secondary self-resonant coil 110, and the like.

Communication device 250 functions as a communication interface to effect wireless communication with electrical powered vehicle 100 that is the destination of power feeding. ECU 260 controls high frequency power driver 220 such that the reception electric power at electrical powered vehicle 100 attains a target value. Specifically, ECU 260 obtains from electrical powered vehicle 100 the reception electric power and its target value of electrical powered vehicle 100 through communication device 250 and controls the output of high frequency power driver 220 such that the reception electric power at electrical powered vehicle 100 matches the target value. ECU 260 can transmit the impedance value of power feeding device 200 to electrical powered vehicle 100.

Figure 2:
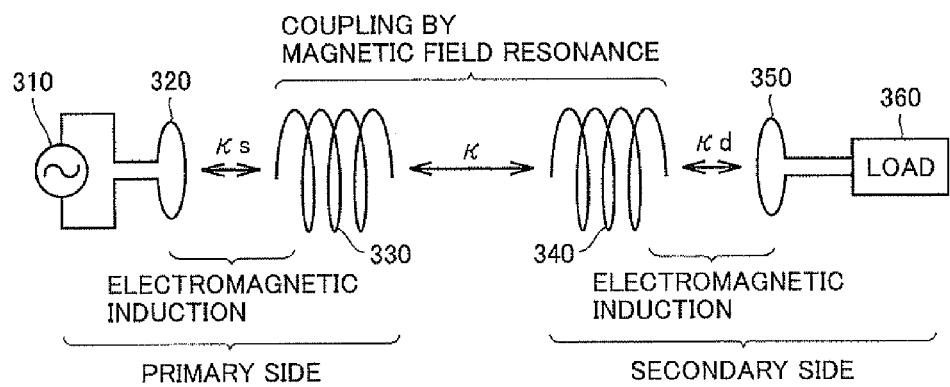
FIG. 2 is a diagram to describe the mechanism of power transmission by a resonance method.

FIG. 2 is a diagram to describe the mechanism of power transmission by the resonance method. Referring to FIG. 2, the resonance method is similar to the resonance of two tuning forks. By the resonance of two LC resonant coils having the same natural frequency at the electromagnetic field (near field), electric power is transferred from one coil to the other coil via the electromagnetic field.

Specifically, primary coil 320 is connected to high frequency power source 310, and electric power of a frequency as high as 1M to ten and several MHz is supplied to primary self-resonant coil 330 that is magnetically coupled with primary coil 320 by electromagnetic induction. Primary self-resonant coil 330 is an LC resonator based on the coil's inductance and floating capacitance, resonating with secondary self-resonant coil 340 having the same resonant frequency as primary self-resonant coil 330 via an electromagnetic field (near field). Accordingly, energy (electric power) is transferred from primary self-resonant coil 330 to secondary self-resonant coil 340 via the electromagnetic field. The energy (electric power) transferred to secondary self-resonant coil 340 is extracted by secondary coil 350 magnetically coupled with secondary self-resonant coil 340 through electromagnetic induction to be provided to a load 360. Power transmission by the resonance method is realized when the Q value representing the resonance strength between primary self-resonant coil 330 and secondary self-resonant coil 340 is higher than 100, for example.

The corresponding relationship with the elements in FIG. 1 will be described hereinafter. AC power source 210 and high frequency power driver 220 of FIG. 1 correspond to high frequency power source 310 of FIG. 2. Primary coil 230 and primary self-resonant coil 240 of FIG. 1 correspond to primary coil 320 and primary self-resonant coil 330, respectively, of FIG. 2. Secondary self-resonant coil 110 and secondary coil 120 of FIG. 1 correspond to secondary self-resonant coil 340 and secondary coil 350, respectively, of FIG. 2. The elements of rectifier 130 and et seq. of FIG. 1 are generically represented as load 360.

Figure 3:
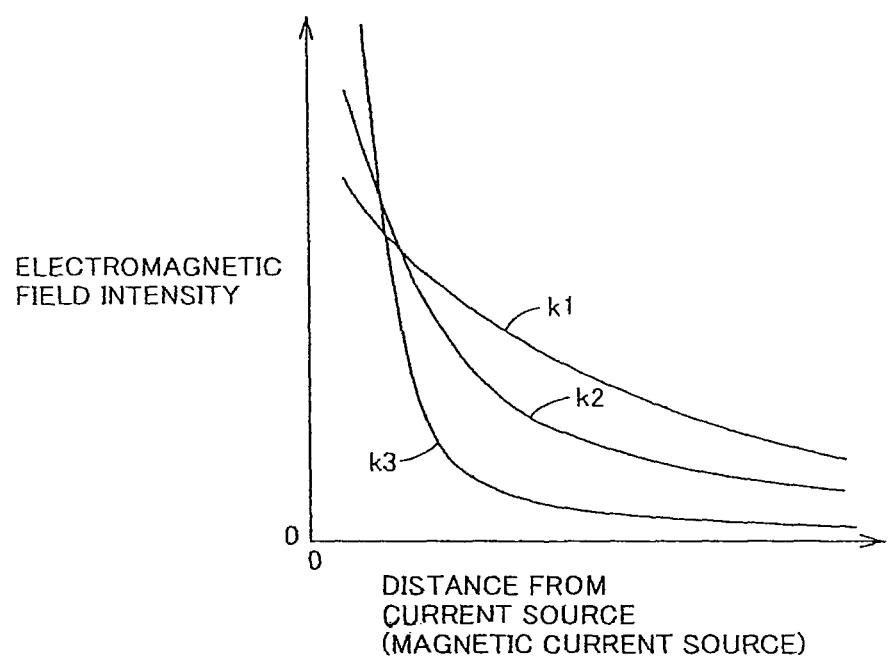
FIG. 3 represents the relationship between the distance from the current source (magnetic current source) and intensity of the electromagnetic field.

FIG. 3 represents the relationship between the distance from a current source (magnetic current source) and the electromagnetic field intensity. Referring to FIG. 3, the electromagnetic field is composed of three components. Curve k1 represents a component inversely proportional to the distance from the wave source, and is referred to as "radiation field". Curve k2 represents a component inversely proportional to the square of the distance from the wave source, and is referred to as "induction field". Curve k3 represents a component inversely proportional to the cube of the distance from the wave source, and is referred to as "electrostatic field".

The "electrostatic field" is a region where the intensity of the electromagnetic wave decreases drastically according to the distance from the wave source. In the resonance method, energy (electric power) is transmitted taking advantage of the near field (evanescent field) where this "electrostatic field" is dominant. Specifically, in the near field where the "electrostatic field" is dominant, a pair of resonators having the same natural frequency (for example, a pair of LC resonant coils) is caused to resonate, whereby energy (electric power) is transferred from one resonator (primary self-resonant coil) to the other resonator (secondary self-resonant coil). Since the "electrostatic field" does not pass on energy far away, the resonance method allows power transmission with lower energy loss as compared to an electromagnetic wave that transmits energy (electric power) by the "radiation field" that passes on energy over a great distance.

Figure 4:
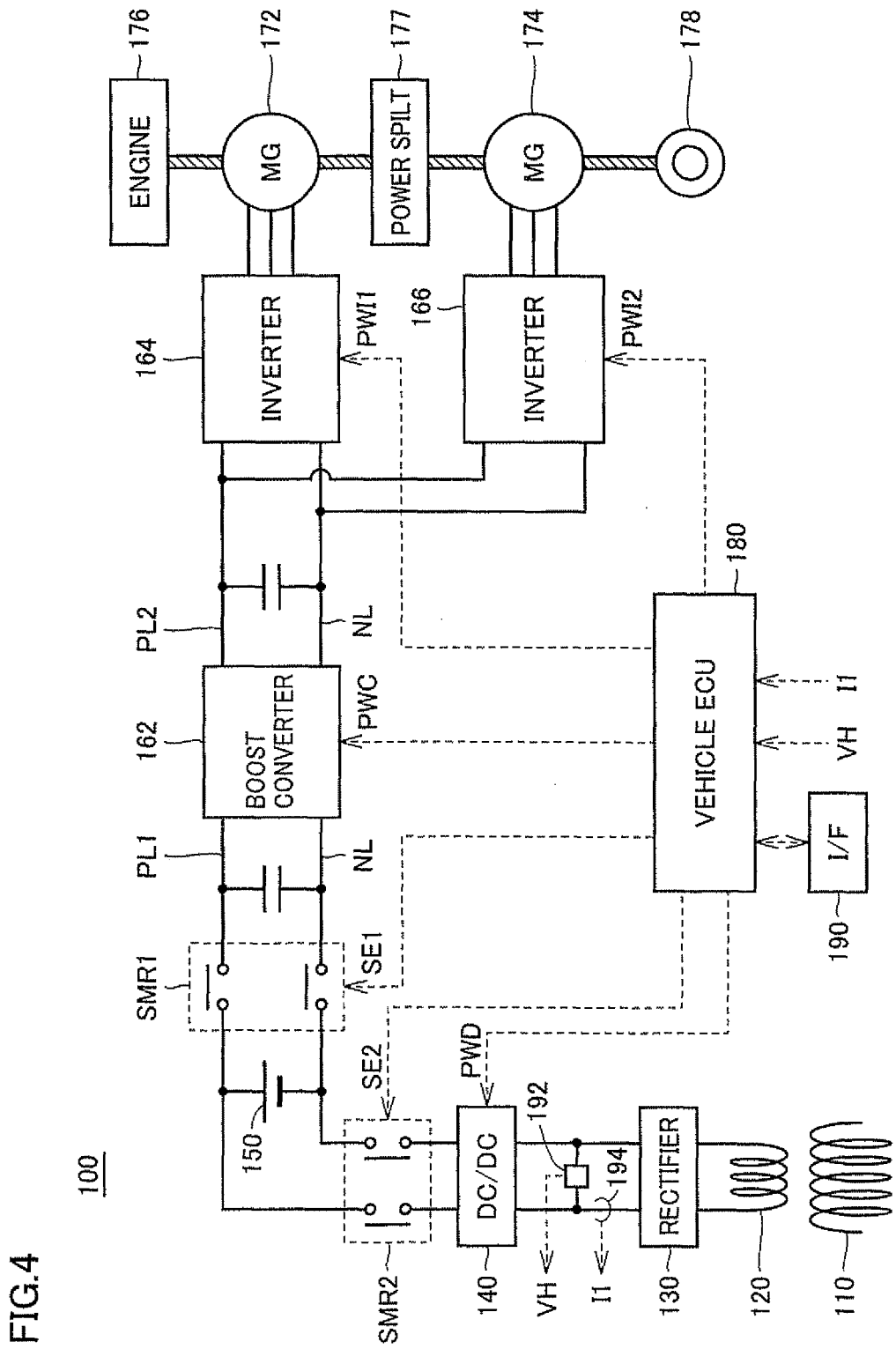
FIG. 4 is a functional block diagram of the entire configuration of the electrical powered vehicle shown in FIG. 1.

FIG. 4 is a block diagram representing a powertrain configuration of electrical powered vehicle 100 of FIG. 1. Referring to FIG. 4, electrical powered vehicle 100 includes a power storage device 150, a system main relay SMR1, a boost converter 162, inverters 164, 166, motor generators 172, 174, an engine 176, a power split device 177, and a driving wheel 178. Additionally, electrical powered vehicle 100 further includes secondary self-resonant coil 110, secondary coil 120, rectifier 130, DC/DC converter 140, system main relay SMR2, vehicle ECU 180, communication device 190, voltage sensor 192, and current sensor 194.

Electrical powered vehicle 100 incorporates engine 176 and motor generator 174 as the driving source. Engine 176 and motor generators 172 and 174 are coupled with power split device 177. Electrical powered vehicle 100 runs by the driving power generated by at least one of engine 176 and motor generator 174. The power generated by engine 176 is divided into two paths by power split device 177. Specifically, one path is directed to driving wheel 178, and the other path is directed to motor generator 172.

Motor generator 172 is an AC rotating electric machine formed of, for example, a 3-phase AC synchronous electric motor having a permanent magnet embedded in a rotor. Motor generator 172 generates electric power using the kinetic energy of engine 176 divided by power split device 177. For example, when the SOC of power storage device 150 becomes lower than a predetermined value, engine 176 is started and electric power is generated by motor generator 172, whereby power storage device 150 is charged.

Motor generator 174 is also an AC rotating electric machine formed of for example, a 3-phase AC synchronous electric motor having a permanent magnet embedded in a rotor, likewise with motor generator 172. Motor generator 174 generates driving power using at least one of the electric power stored at power storage device 150 and the electric power generated by motor generator 172. The driving power of motor generator 174 is transmitted to driving wheel 178.

In a braking mode of the vehicle or in an acceleration reducing mode at a downward slope, the mechanical energy stored at the vehicle as a kinetic energy or potential energy is used for the rotational drive of motor generator 174 through driving wheel 178, whereby motor generator 174 operates as a power generator. Accordingly, motor generator 174 operates as a regenerative brake converting the running energy into electric power to generate the braking force. The electric power generated by motor generator 174 is stored in power storage device 150. Motor generator 174 corresponds to motor 170 shown in FIG. 1.

Power split device 177 is formed of a planetary gear set including a sun gear, a pinion gear, a carrier, and a ring gear. The pinion gear engages with the sun gear and ring gear. The carrier supports the pinion gear to allow rotation on its axis, and is coupled to the crankshaft of engine 176. The sun gear is coupled to the rotational shaft of motor generator 172. The ring gear is coupled to the rotational shaft of motor generator 174 and to driving wheel 178.

System main relay SMR1 is disposed between power storage device 150 and boost converter 162. System main relay SMR1 electrically connects power storage device 150 with boost converter 162 when a signal SE1 from vehicle ECU 180 is rendered active, and disconnects the electrical path between power storage device 150 and boost converter 162 when signal SE1 is rendered inactive.

Boost converter 162 responds to a signal PWC from vehicle ECU 180 to boost the voltage output from power storage device 150 for output onto positive line PL2. For example, a DC chopper circuit constitutes this boost converter 162.

Inverters 164 and 166 are provided corresponding to motor generators 172 and 174, respectively. Inverter 164 drives motor generator 172 based on a signal PWI1 from vehicle ECU 180. Inverter 166 drives motor generator 174 based on a signal PWI2 from vehicle ECU 180. A 3-phase bridge circuit, for example, constitutes each of inverters 164 and 166.

Boost converter 162 and inverters 164 and 166 correspond to PCU 160 of FIG. 1.

Secondary self-resonant coil 110, secondary coil 120, rectifier 130 and DC/DC converter 140 are as described with reference to FIG. 1. System main relay SMR2 is disposed between DC/DC converter 140 and power storage device 150. System main relay SMR2 electrically connects power storage device 150 with DC/DC converter 140 when a signal SE2 from vehicle ECU 180 is rendered active, and disconnects the electrical path between power storage device 150 and DC/DC converter 140 when signal SE2 is rendered inactive.

Voltage sensor 192 detects a voltage VH between rectifier 130 and DC/DC converter 140 to provide the detection value to vehicle ECU 180. Current sensor 194 detects a current I1 output from rectifier 130 to provide the detection value to vehicle ECU 180.

Vehicle ECU 180 generates signals PWC, PWI1 and PWI2 to drive boost converter 162, motor generator 172, and motor generator 174, respectively, based on the accelerator pedal position, vehicle speed, and signals from various sensors. The generated signals PWC, PWI1 and PWI2 are output to boost converter 162, inverter 164, and inverter 166, respectively.

In a vehicle running mode, vehicle ECU 180 renders signal SE1 active to turn on system main relay SMR1, and renders signal SE2 inactive to turn off system main relay SMR2. In the case where electric power can be received from the power feeding device during a running mode of the vehicle, vehicle ECU 180 may render signals SE1 and SE2 active to turn on both system main relays SMR1 and SMR2.

In a power receiving mode from power feeding device 200 external to the vehicle, vehicle ECU 180 renders signal SE1 inactive to turn off system main relay SMR1, and renders signal SE2 active to turn on system main relay SMR2.

Vehicle ECU 180 calculates target voltage VHref indicating the target value of voltage VH based on the aforementioned equation (1), Vehicle ECU 180 may obtain the impedance value of power feeding device 200 therefrom through communication device 190, and calculate target voltage VHref based on equation (1) using the obtained impedance value. Vehicle ECU 180 generates a signal PWD to control DC/DC converter 140 such that voltage VH matches target voltage VHref, and provides the generated signal PWD to DC/DC converter 140.

Vehicle ECU 180 calculates the reception electric power from power feeding device 200 based on voltage VH from voltage sensor 192 and current I1 from current sensor 194, and transmits the calculated value together with the target value of the reception electric power to power feeding device 200 through communication device 190.

Figure 5:
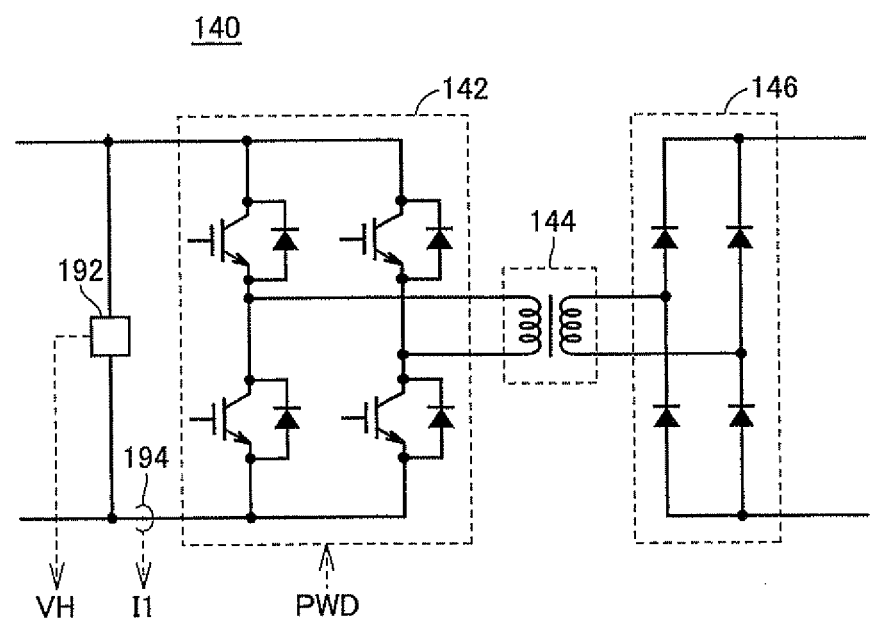
FIG. 5 is a circuit diagram of the DC/DC converter shown in FIG. 4.

FIG. 5 is a circuit diagram of DC/DC converter 140 shown in FIG. 4, Referring to FIG. 5, DC/DC converter 140 includes a DC/AC conversion unit 142, a transformer unit 144, and a rectifier unit 146. DC/AC conversion unit 142 includes a switching element driven on/off based on signal PWD from vehicle ECU 180 to convert the DC power supplied from rectifier 130 (not shown) into AC power for output to transformer unit 144.

Transformer unit 144 insulates DC/AC conversion unit 142 from rectifier unit 146 and carries out voltage conversion according to the coil winding ratio. Rectifier unit 146 rectifies the AC power output from transformer unit 144 into DC power for output to power storage device 150 (not shown).

At DC/DC converter 140, the input voltage to DC/AC conversion unit 142, i.e. voltage VH, can be controlled by adjusting the modulation factor of DC/AC conversion unit 142 based on signal PWD from vehicle ECU 180.

Figure 6:
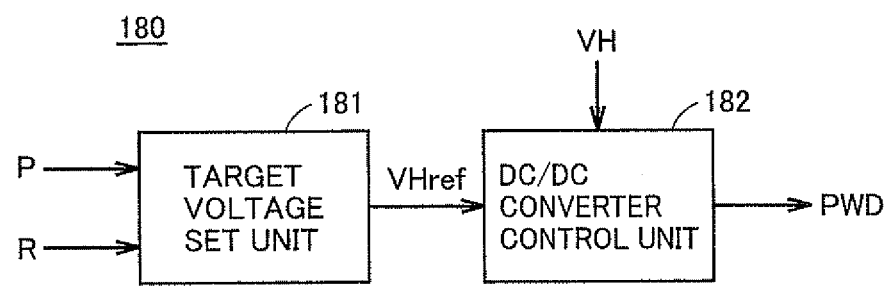
FIG. 6 is a functional block diagram related to control of the DC/DC converter by a vehicle ECU shown in FIG. 4.

FIG. 6 is a functional block diagram related to control of DC/DC converter 140 by vehicle ECU 180 shown in FIG. 4. Referring to FIG. 6, vehicle ECU 180 includes a target voltage set unit 181, and a DC/DC converter control unit 182. Target voltage set unit 181 calculates target voltage VHref according to aforementioned equation (1) based on target value P of the electric power receiving from power feeding device 200 (FIG. 1) and the target impedance.

DC/DC converter control unit 182 generates a PWM (Pulse Width Modulation) signal directed to driving DC/DC converter 140 such that voltage VH detected by voltage sensor 192 (FIG. 4) matches target voltage VHref, and outputs the generated PWM signal to DC/DC converter 140 as signal PWD.

Referring to FIG. 1 again, in the present power feeding system, power feeding from power feeding device 200 to electrical powered vehicle 100 is effected by causing resonance of primary self-resonant coil 240 of power feeding device 200 and secondary self-resonant coil 110 of electrical powered vehicle 100 through an electromagnetic field (near field). At power feeding device 200, power control is effected based on reception electric power transmitted from electrical powered vehicle 100 and its target value. At electrical powered vehicle 100, voltage is controlled such that voltage VH between rectifier 130 and DC/DC converter 140 attains target voltage VHref by controlling DC/DC converter 140. Target voltage VHref is set based on aforementioned equation (1). By setting target impedance R in equation (1) based on the impedance value of power feeding device 200, impedance matching between power feeding device 200 of the power transmission side and electrical powered vehicle 100 of the power reception side can be established.

Figure 7:
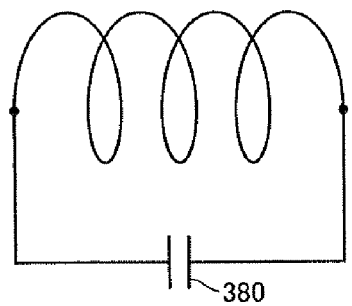
FIG. 7 represents another configuration of the self-resonant coil.

Although it has been described in the foregoing that the capacitor component of each of secondary self-resonant coil 110 and primary self-resonant coil 240 correspond to the floating capacitance of each resonant coil, a configuration may be employed in which a capacitor 380 is connected across the ends of the coil at each of secondary self-resonant coil 110 and primary self-resonant coil 240, as shown in FIG. 7.

Figure 8:
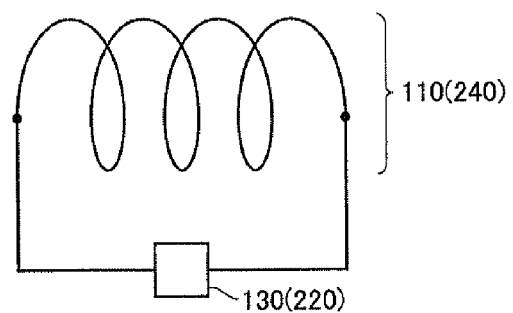
FIG. 8 represents a further configuration of the self-resonant coil.

Furthermore, although it has been described in the foregoing that electric power is extracted from secondary self-resonant coil 110 by electromagnetic induction using secondary coil 120, and power is fed to primary self-resonant coil 240 by electromagnetic induction using primary coil 230, electric power can be directly output to rectifier 130 from secondary self-resonant coil 110 without having to provide secondary coil 120, and directly supply electric power from high frequency power driver 220 to primary self-resonant coil 240, as shown in FIG. 8.

Figure 9:
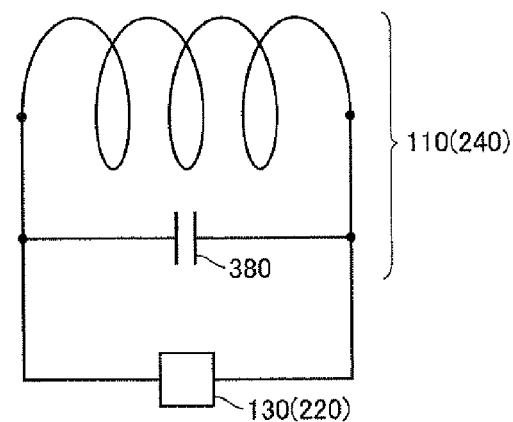
FIG. 9 represents a further configuration of the self-resonant coil.

In addition, a capacitor 380 may be connected parallel to the coil in the configuration of FIG. 8 to provide a capacitor component, as shown in FIG. 9.

Thus, voltage VH between rectifier 130 and DC/DC converter 140 can be controlled to attain target voltage VHref at electrical powered vehicle 100 in the first embodiment. Therefore, the impedance can be set at electrical powered vehicle 100 without depending on the reception electric power from power feeding device 200. By setting this impedance based on the impedance value of power feeding device 200, impedance matching can be established at each of power feeding device 200 of the power transmission side and electrical powered vehicle 100 of the power receiving side. According to the first embodiment, power feeding of high efficiency can be realized in a non-contact manner by way of the resonance method.

[Modification]

In the above-described first embodiment, power control is effected at power feeding device 200, whereas voltage control of voltage VH is effected at electrical powered vehicle 100. Alternatively, power control may be effected at electrical powered vehicle 100, whereas voltage control may be effected at power feeding device 200.

Figure 10:
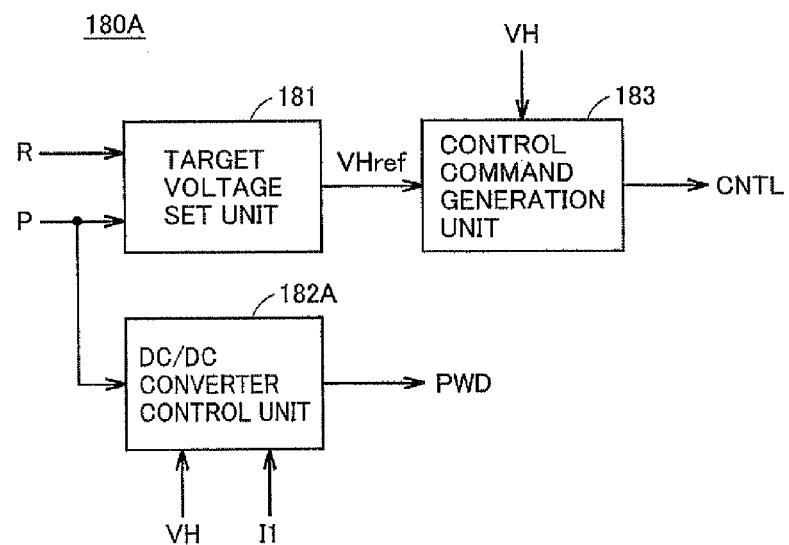
FIG. 10 is a functional block diagram related to control of a DC/DC converter by a vehicle ECU according to a modification.

FIG. 10 is a functional block diagram related to control of DC/DC converter 140 by a vehicle ECU 180A according to the present modification. Referring to FIG. 10, a vehicle ECU 180A includes a target voltage set unit 181, a DC/DC converter control unit 182A, and a control command generation unit 183.

Target voltage set unit 181 calculates target voltage VHref by aforementioned equation (1) based on target value P of the power received from power feeding device 200 and the target impedance. Control command generation unit 183 generates a control signal CNTL directed to driving high frequency power driver 220 (FIG. 1) of power feeding device 200 such that voltage VH detected by voltage sensor 192 (FIG. 4) matches target voltage VHref, and transmits generated control signal CNTL to power feeding device 200 through communication device 190 (FIG. 1). At power feeding device 200, high frequency power driver 220 is controlled based on control signal CNTL such that voltage VH is adjusted to target voltage VHref.

DC/DC converter control unit 182A calculates reception electric power based on voltage VH and current I1 detected by current sensor 194 (FIG. 4). DC/DC converter control unit 182A generates signal PWD directed to driving DC/DC converter 140 such that the calculated reception electric power matches target value P, and provides the generated signal PWD to DC/DC converter 140.

According to the present modification, power control to set the reception electric power at the target value is carried out at electrical powered vehicle 100, whereas voltage control to set voltage VH of electrical powered vehicle 100 at target voltage VHref is carried out by controlling high frequency power driver 220 of power feeding device 200.

[Second Embodiment]

The operating point to realize the optimum power feeding efficiency will change when there is variation in the system parameter due to temperature change and the like at the power feeding device and/or resonant unit (primary self-resonant coil 240 and secondary self-resonant coil 110).

Figure 11:
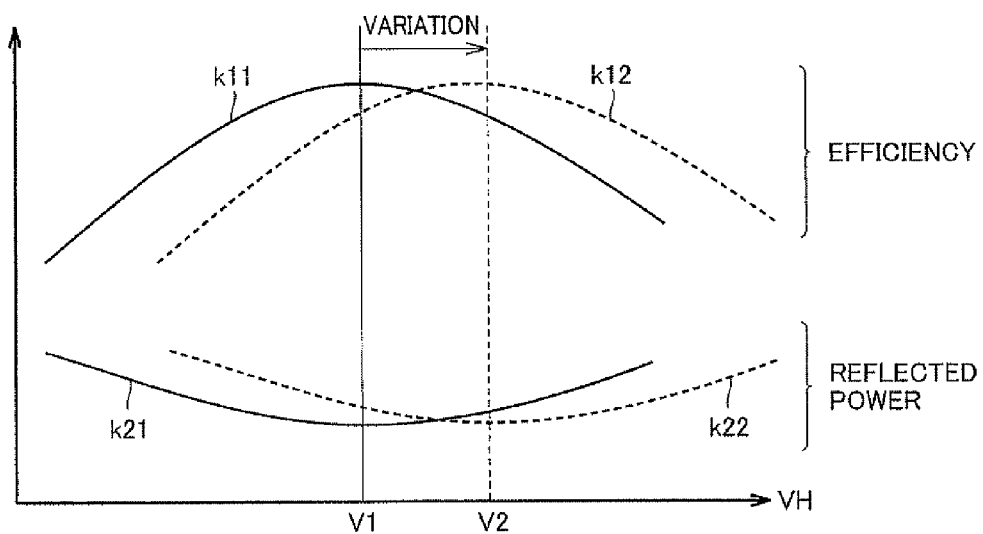
FIG. 11 represents change in the efficiency and reflected power with respect to system parameter variation.

FIG. 11 represents the change in efficiency and reflected power with respect to system parameter variation. Referring to FIG. 11, curve k11 represents the relationship between a voltage VH representing the voltage of the electric power received at the electrical powered vehicle and the efficiency. Curve k21 represents the relationship between voltage VH and the reflected power under a condition identical to that of curve k11. The efficiency is maximum when the reflected power is minimum. Under this condition, the efficiency is maximum when voltage VH is V1.

When the system parameter varies due to temperature change and the like at the power feeding device and/or resonant unit, the relationship between voltage VH and the efficiency changes from curve k11 to curve k12, and the relationship between voltage VH and the reflected power changes from curve k21 to k22. Voltage VH where the efficiency is maximum changes from V1 to V2.

In the second embodiment, voltage VH is altered with respect to the system parameter variation to achieve impedance matching relative to parameter variation, Specifically, the reflected power is sensed at the power feeding device to alter voltage VH such that the reflected power is reduced.

The entire configuration of the power feeding system according to the second embodiment is basically similar to that shown in FIG. 1.

Figure 12:
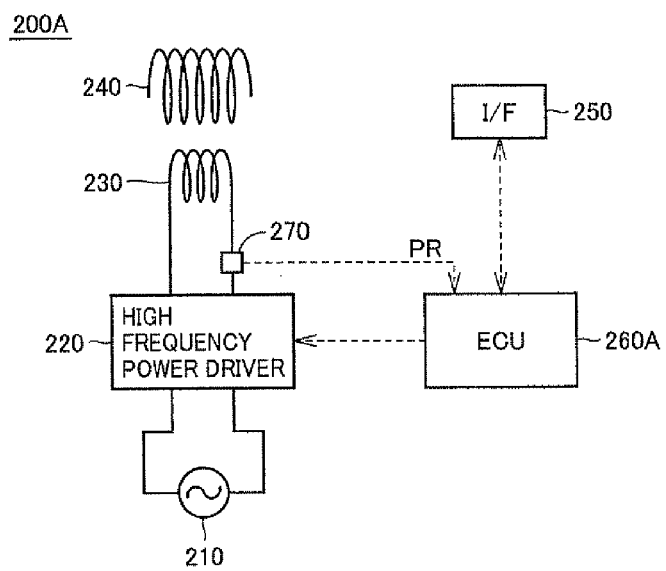
FIG. 12 is a functional block diagram of a power feeding device according to a second embodiment of the present invention.

FIG. 12 is a functional block diagram of a power feeding device 200A according to the second embodiment. Referring to FIG. 12, power feeding device 200A further includes a reflected power sensor device 270, and an ECU 260A, instead of ECU 260, in the configuration of power feeding device 200 of the first embodiment. Reflected power sensor device 270 is arranged at the output line of high frequency power driver 220 to sense and output to ECU 260A a reflected power PR. The well-known reflected power sensor device can be employed for reflected power sensor device 270.

ECU 260A receives a sensed value of reflected power PR from reflected power sensor device 270, and transmits the received sensed value to the electrical powered vehicle through communication device 250. The remaining functions of ECU 260A are similar to those of ECU 260 of the first embodiment.

Figure 13:
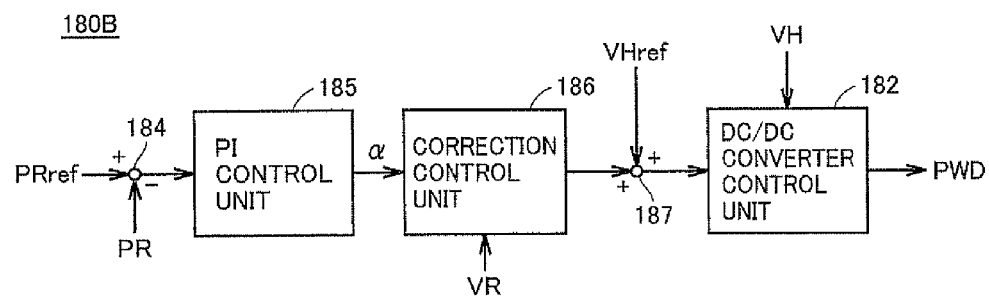
FIG. 13 is a functional block diagram related to control of a DC/DC converter by a vehicle ECU according to the second embodiment.

FIG. 13 is a functional block diagram related to control of DC/DC converter 140 by vehicle ECU 180B of the second embodiment. Referring to FIG. 13, vehicle ECU 180B includes a subtracter 184, a proportional integral (PI) control unit 185, a correction control unit 186, an adder 187, and DC/DC converter control unit 182.

Subtracter 184 subtracts the sensed value of reflected power PR received by communication device 190 from a predetermined target value PRref of the reflected power, and provides the calculated result to PI control unit 185. PI control unit 185 carries out a proportional integral operation with the difference between reflected power target value PRref and reflected power PR as the input value, and provides the calculated result to correction control unit 186 as a control output α.

Correction control unit 186 calculates a correction value for voltage VH based on control output α from PI control unit 185 and reflected power PR by a method that will be described afterwards. Adder 187 adds the output from correction control unit 186 to target voltage VHref, and provides the added result to DC/DC converter control unit 182. DC/DC converter control unit 182 generates a signal PWD directed to controlling DC/DC converter 140 such that voltage VH matches the corrected target voltage output from adder 187, and provides the generated signal PWD to DC/DC converter 140.

Figure 14:
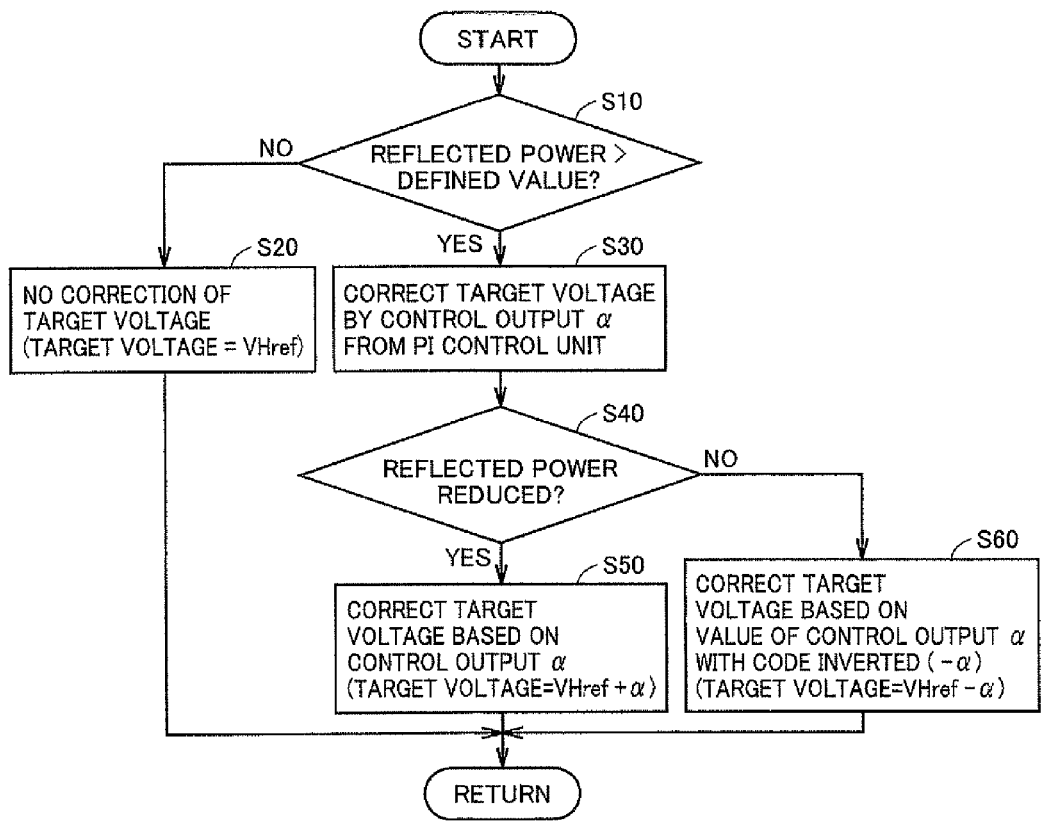
FIG. 14 is a flowchart to describe a process of the correction control unit shown in FIG. 13.

FIG. 14 is a flowchart to describe the process of correction control unit 186 shown in FIG. 13. The process in the flowchart is invoked from the main routine for execution at every constant period of time or every time a predetermined condition is established.

Referring to FIG. 14, correction control unit 186 determines whether reflected power PR is greater than a predetermined defined value (step S10). For this defined value, a target value PRref of reflected power PR, for example, is set. When a determination is made that reflected power PR is less than or equal to the defined value (NO at step S10), correction control unit 186 does not correct target voltage VHref (step S20). Namely, correction control unit 186 sets the output to adder 187 to zero.

When a determination is made that reflected power PR is greater than the defined value at step S10 (YES at step S10), correction control unit 186 corrects target voltage VHref by the control output α from PI control unit 185 (step S30). Then, correction control unit 186 determines whether reflected power PR is reduced or not by the correction of target voltage VHref performed at step S30 (step S40).

When a determination is made that reflected power PR is reduced at step S40 (YES at step S40), correction control unit 186 corrects target voltage VHref based on control output α from PI control unit 185 (step S50). When a determination is made that reflected power PR is increased at step S40 (NO at step S40), correction control unit 186 corrects target voltage VHref based on a value that is an inverted code version of control output α, i.e. −α (step S60).

Thus, voltage VH is controlled in the second embodiment such that the reflected power is reduced with respect to system parameter variation caused by temperature change and the like at the power feeding device and/or resonance unit. Therefore, according to the second embodiment, the optimum power feeding efficiency can be achieved constantly.

[Third Embodiment]

The third embodiment has display means provided for indicating that the electric power is currently being received when the electrical powered vehicle is receiving power transmission from the power feeding device.

Figure 15:
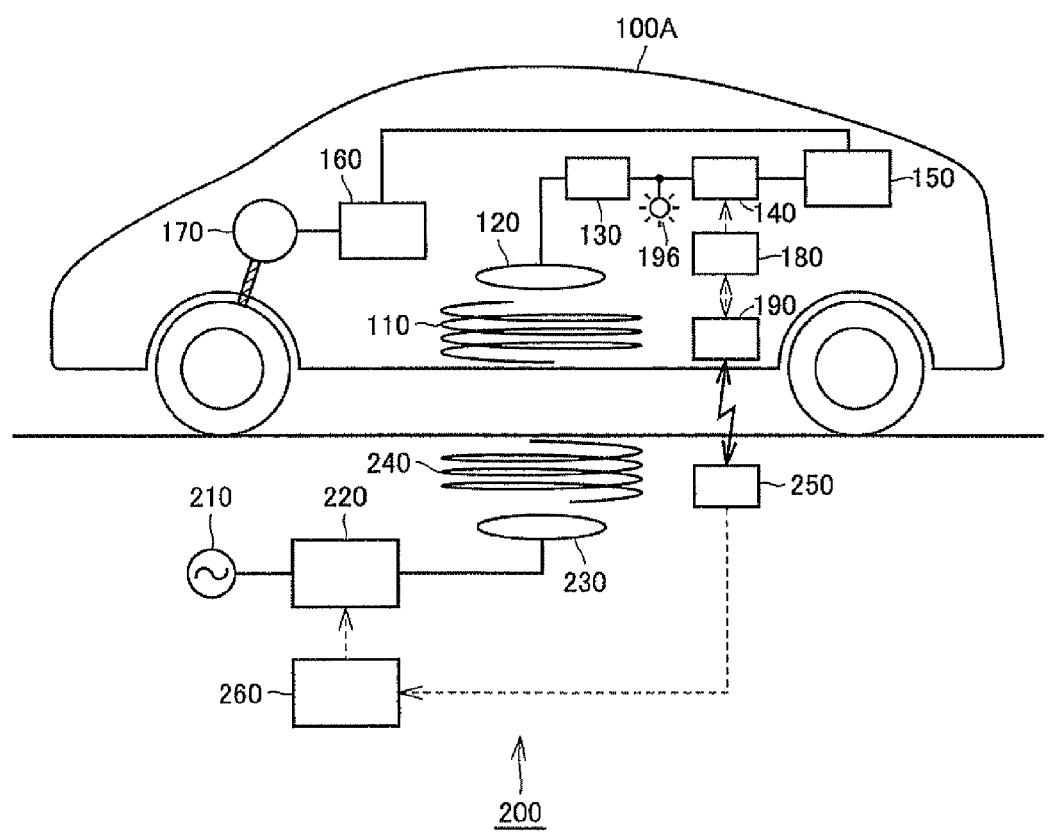
FIG. 15 represents an entire configuration of a power feeding system according to a third embodiment.

FIG. 15 represents an entire configuration of the power feeding system of the third embodiment. Referring to FIG. 15, the power feeding system of the third embodiment includes an electrical powered vehicle 100A, instead of electrical powered vehicle 100, based on the configuration of the power feeding system of the first embodiment shown in FIG. 1. Electrical powered vehicle 100A further includes an indicator lamp 196 in the configuration of electrical powered vehicle 100 shown in FIG. 1.

Indicator lamp 196 is connected to the power line between rectifier 130 and DC/DC converter 140, and emits light using the electric power output from rectifier 130. Namely, indicator lamp 196 is lit using the reception electric power from power feeding device 200. Indicator lamp 196 automatically emits light according to reception of power from power feeding device 200, and automatically is turned off when power is not received.

According to the third embodiment, indicator means for indicating that the electrical powered vehicle is currently receiving power from power feeding device 200 can be realized readily and economically. Since the light is turned on/off automatically according to power reception from power feeding device 200, additional means for controlling the on/off of the lamp is not required. This power reception display system is relatively robust against system failure.

[Modification]

Figure 16:
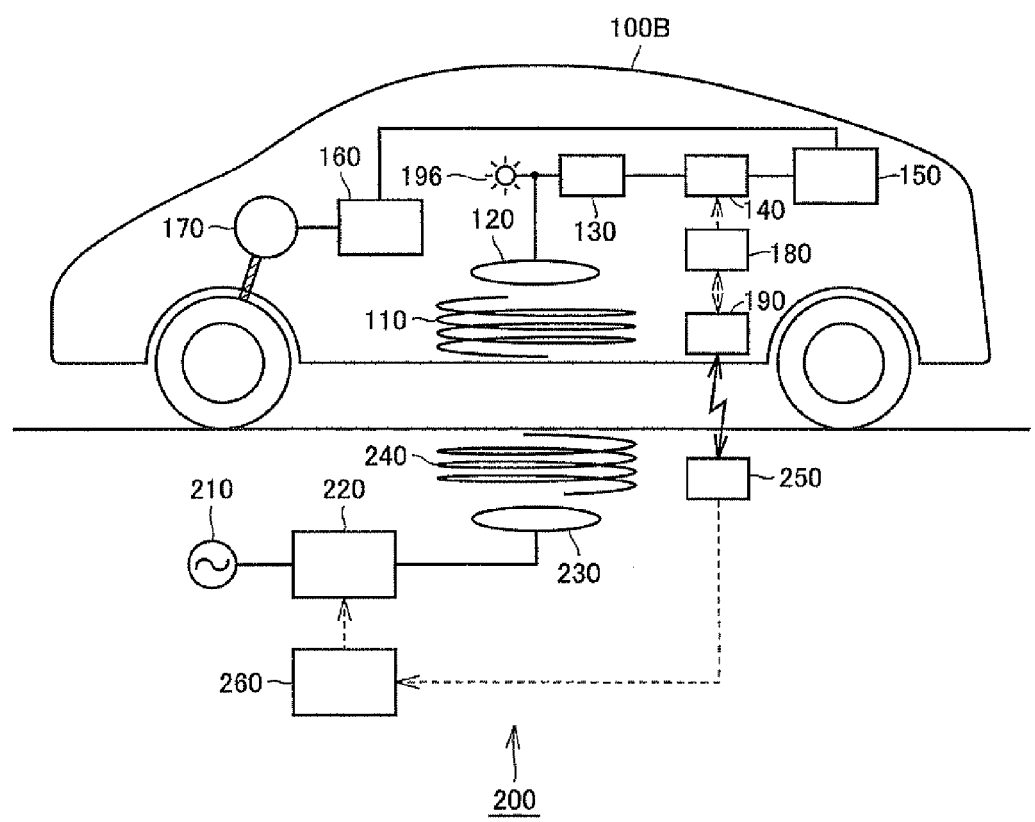
FIG. 16 represents an entire configuration of a power feeding system according to a modification of the third embodiment.

FIG. 16 represents an entire configuration of a power feeding system according to a modification of the third embodiment. Referring to FIG. 16, an electrical powered vehicle 100B of the present modification similarly includes indicator lamp 196. Indicator lamp 196 is connected to a power line between secondary coil 120 and rectifier 130 to emit light using the electric power output from secondary coil 120. Namely, indicator lamp 196 is similarly lit using the reception electric power from power feeding device 200 in the present modification. Therefore, indicator lamp 196 emits light automatically according to the reception of power from power feeding device 200, and is automatically turned off when power is not received.

By the present modification, an advantage similar to that of the third embodiment set forth above is obtained.

Although each of the above embodiments is directed to power transmission by causing a pair of self-resonant coils to resonate, a high dielectric disk may be used for the resonator instead of the self-resonant coil.

Figure 17:
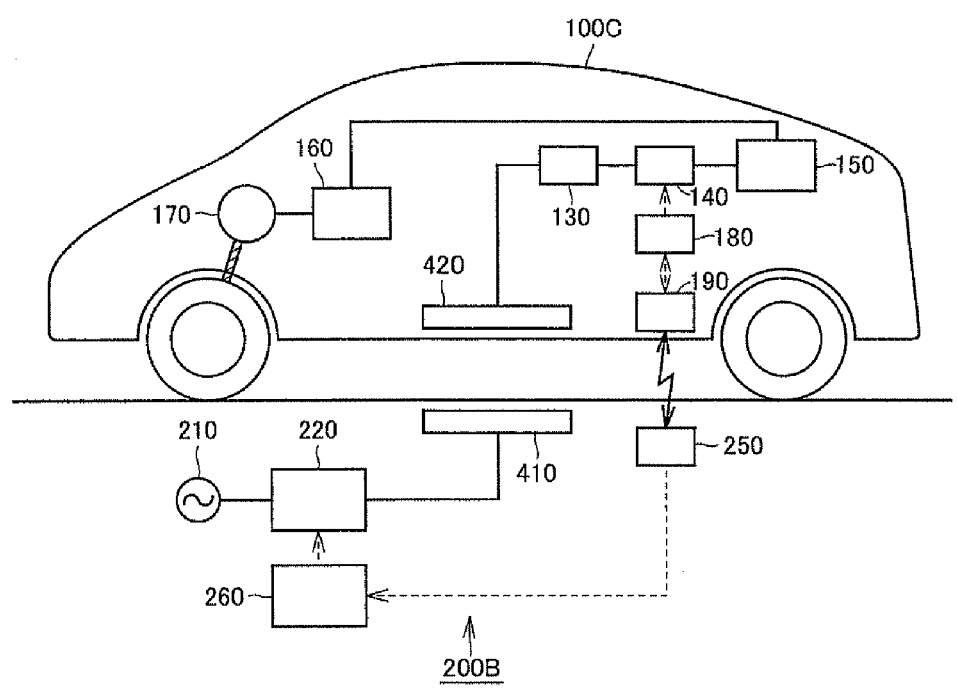
FIG. 17 is an entire block diagram of a power feeding system employing a high dielectric disk as a resonator.

FIG. 17 is an overall block diagram of a power feeding system employing a high dielectric disk as a resonator. Referring to FIG. 17, a power feeding device 200B includes a primary high dielectric disk 410 instead of primary self-resonant coil 240 and primary coil 230, based on the configuration of power feeding device 200 of FIG. 1. An electrical powered vehicle 100C includes a secondary high dielectric disk 420 instead of secondary self-resonant coil 110 and secondary coil 120, based on the configuration of electrical powered vehicle 100 of FIG. 1. Each of primary high dielectric disk 410 and secondary high dielectric disk 420 is formed of a material of high permittivity such as $TiO_2$, $BaTi_4O_9$, and $LiTaO_3$. By causing resonance of primary high dielectric disk 410 and secondary high dielectric disk 420 via an electric field (near field), power can be transferred from power feeding device 200B to electrical powered vehicle 100C.

Although each of the embodiments is described based on a series/parallel type hybrid vehicle in which the driving power of engine 176 is split by power split device 177 to be transmitted to driving wheel 178 and motor generator 172 as an electrical powered vehicle, the present invention is also applicable to other types of hybrid vehicles. For example, the present invention is applicable to the so-called series type hybrid vehicle using the engine 176 only for driving motor generator 172, and the driving power of the vehicle is generated by motor generator 174 alone, a hybrid vehicle having only the regenerative energy among the kinetic energy generated by engine 176 collected as electric energy, a motor assist type hybrid vehicle using the engine as the main driving source and assisted by the motor as necessary, and the like.

Further, the present invention is applicable to an electric vehicle that runs only by electric power, lacking an engine 176, or a fuel cell vehicle further including a fuel battery in addition to power storage device 150 as the DC power source. Moreover, the present invention is also applicable to an electrical powered vehicle lacking a boost converter 162.

In the foregoing, DC/DC converter 140 corresponds to an embodiment of "voltage converter" of the present invention. Vehicle ECUs 180, 180A and 180B correspond to an embodiment of "voltage control device" of the present invention. Reflected power sensor device 270 constitutes an example of a "sensor device" of the present invention. PCU 160 and motor 170 (boost converter 162, inverters 164, 166, and motor generator 174) constitute an embodiment of "electric drive device" of the present invention.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

The invention claimed is:

1. A power feeding system comprising:
a power reception resonator receiving electric power from a power transmission resonator receiving electric power from a power source to generate an electromagnetic field, by resonating with said power transmission resonator via said electromagnetic field,
a rectifier rectifying electric power received by said power reception resonator,
a voltage converter voltage-converting the electric power rectified by said rectifier for supply to a load, and
a voltage control device controlling a voltage between said rectifier and said voltage converter to attain a predetermined target voltage,
said voltage control device setting said predetermined target voltage based on a magnitude of reception electric power.

2. The power feeding system according to claim 1, wherein said voltage control device sets said predetermined target voltage at a square root value of a multiplication of a target value of reception electric power by a target impedance.

3. The power feeding system according to claim 2, wherein said target impedance is set at an impedance of said power source.

4. The power feeding system according to claim 1, wherein
said voltage converter is configured to allow adjustment of an input voltage thereto, and
said voltage control device controls said voltage converter such that the voltage between said rectifier and said voltage converter attains said predetermined target voltage.

5. The power feeding system according to claim 1, wherein
said voltage converter is configured to allow adjustment of an input electric power thereto, and
said voltage control device controls said power source such that the voltage between said rectifier and said voltage converter attains said predetermined target voltage.

6. The power feeding system according to claim 1, wherein said power transmission resonator includes
a primary coil receiving electric power from said power source, and
a primary self-resonant coil having electric power fed from said primary coil by electromagnetic induction, and generating said electromagnetic field,
wherein said power reception resonator includes
a secondary self-resonant coil receiving electric power from said primary self-resonant coil by resonating with said primary self-resonant coil via said electromagnetic field, and
a secondary coil extracting electric power received by said secondary self-resonant coil through electromagnetic induction for output to said rectifier.

7. The power feeding system according to claim 1, wherein each of said power transmission resonator and said power reception resonator includes a high dielectric disk.

8. The power feeding system according to claim 1, wherein said load includes a rechargeable power storage device.

9. The power feeding system according to claim 1, wherein
said load includes an electric drive device mounted on a vehicle to generate a vehicle driving power, and
said electric drive device receives electric power output from said voltage converter to generate said vehicle driving power.

10. A power feeding system comprising:
a power reception resonator receiving electric power from a power transmission resonator receiving electric power from a power source to generate an electromagnetic field, by resonating with said power transmission resonator via said electromagnetic field,
a rectifier rectifying electric power received by said power receptor resonator,
a voltage converter voltage-converting the electric power rectified by said rectifier for supply to a load,
a voltage control device controlling a voltage between said rectifier and said voltage converter to attain a predetermined target voltage, and a sensor device sensing reflected power of electric power supplied from said power source to said power transmission resonator, wherein said voltage control device modifies said predetermined target voltage such that said reflected power is reduced.

11. The power feeding system according to claim 10, wherein said voltage control device calculates, when said reflected power is greater than or equal to a defined value, an amount of modification of said predetermined target voltage based on a difference between a target value of reflected power that is less than or equal to said defined value and reflected power sensed by said sensor device.

12. The power feeding system according to claim 10, wherein said sensor device calculates said reflected power based on a voltage and current of electric power supplied from said power source to said power transmission resonator, and a phase difference between said voltage and said current.

13. An electrical powered vehicle comprising:

a power reception resonator receiving electric power from a power transmission resonator included in a power feeding device provided external to the vehicle by resonating with said power transmission resonator via an electromagnetic field, a rectifier rectifying electric power received by said power reception resonator, a voltage converter voltage-converting the electric power rectified by said rectifier, an electric drive device generating a vehicle driving power using electric power output from said voltage converter, and a voltage control device controlling a voltage between said rectifier and said voltage converter to attain a predetermined target voltage, said voltage control device setting said predetermined target voltage based on a magnitude of reception electric power.

14. The electrical powered vehicle according to claim 13, wherein said voltage control device sets said predetermined target voltage at a square root value of a multiplication of a target value of reception electric power by a target impedance.

15. The electrical powered vehicle according to claim 14, wherein said target impedance is set at an impedance of said power feeding device.

16. The electrical powered vehicle according to claim 13, wherein said voltage converter is configured to allow adjustment of an input voltage thereto, and said voltage control device controls said voltage converter such that the voltage between said rectifier and said voltage converter to attain said predetermined target voltage.

17. The electrical powered vehicle according to claim 13, further comprising a communication device for communication with said power feeding device, wherein said voltage converter is configured to allow adjustment of an input electric power thereto, said voltage control device controls a power source via said communication device such that the voltage between said rectifier and said voltage converter attains said predetermined target voltage.

18. The electrical powered vehicle according to claim 13, wherein said power transmission resonator includes a primary coil receiving electric power from a power source, and a primary self-resonant coil having electric power fed from said primary coil by electromagnetic induction to generate said electromagnetic field, said power reception resonator includes a secondary self-resonant coil receiving electric power from said primary self-resonant coil by resonating with said primary self-resonant coil via said electromagnetic field, and a secondary coil extracting electric power received by said secondary self-resonant coil through electromagnetic induction for output to said rectifier.

19. The electrical powered vehicle according to claim 13 wherein each of said power transmission resonator and said power reception resonator incluers a high dielectric disk.

20. The electrical powered vehicle according to claim 13, further comprising a power storage device storing electric power output from said voltage converter.

21. An electrical powered vehicle comprising:

a power reception resonator receiving electric power from a power transmission resonator included in a power feeding device provided external to the vehicle by resonating with said power transmission resonator via an electromagnetic field, a rectifier rectifying electric power received by said power reception resonator, a voltage converter voltage-converting the electric power rectified by said rectifier, an electric drive device generating a vehicle driving power using electric power output from said voltage converter, a voltage control device controlling a voltage between said rectifier and said voltage converter to attain a predetermined target voltage, and a communication device for communication with said power feeding device, wherein a reflected power of electric power supplied from a power source to said power transmission resonator is sensed at said power feeding device, said voltage control device receives said reflected power sensed at said power feeding device through said communication device, and modifies said predetermined target voltage such that said reflected power is reduced.

22. The electrical powered vehicle according to claim 21, wherein said voltage control device calculates, when said reflected power is greater than or equal to a defined value, an amount of modification of said predetermined target voltage based on a difference between a target value of reflected power that is less than or equal to said defined value and said reflected power received through said communication device.

23. The electrical powered vehicle according to claim 21, wherein said reflected power is calculated based on a voltage and current of electric power supplied from said power source to said power transmission resonator, and a phase difference between said voltage and said current.

* * * * *